Aug. 23, 1938.  L. H. ADAMSON  2,127,852
FIELD MARKER
Filed March 1, 1937
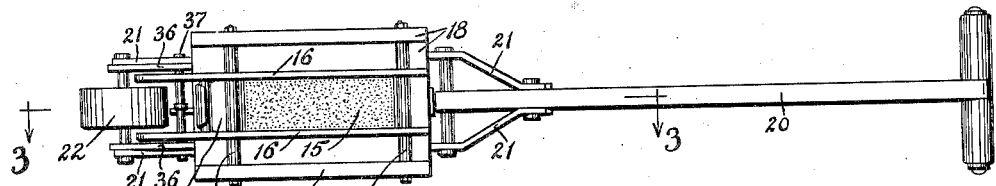
Fig. 1
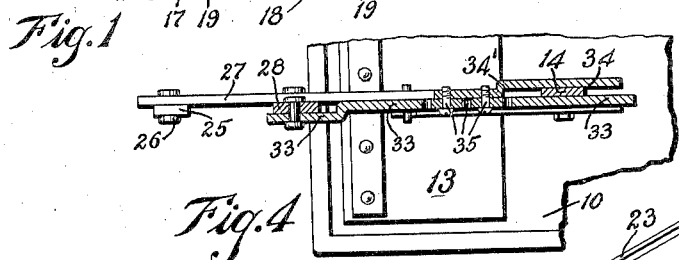
Fig. 4
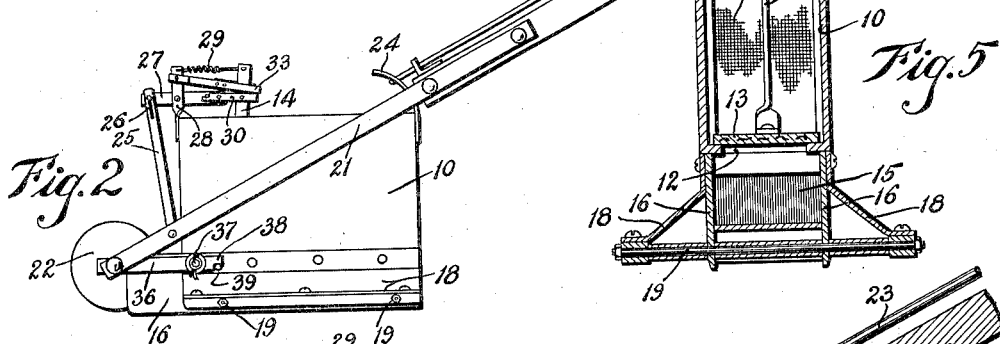
Fig. 2
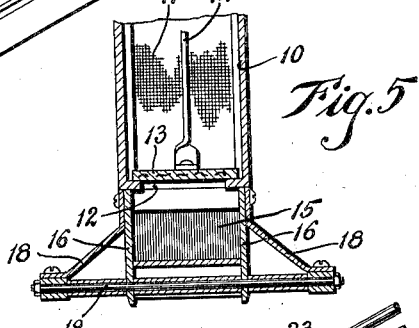
Fig. 5
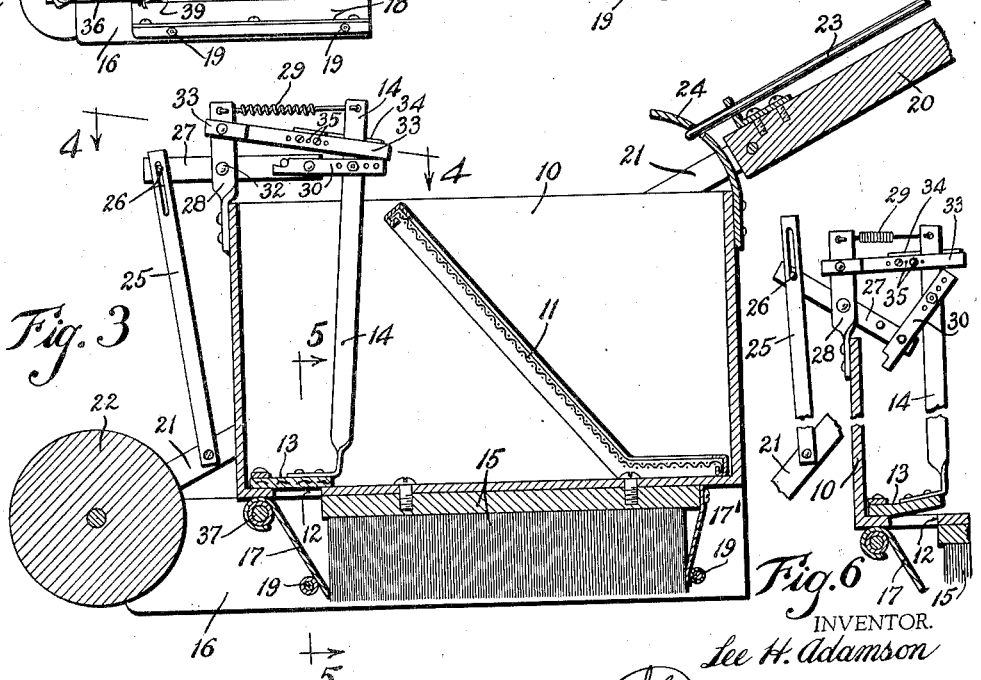
Fig. 3
Fig. 6
INVENTOR.
Lee H. Adamson
BY
ATTORNEY.

Patented Aug. 23, 1938

2,127,852

UNITED STATES PATENT OFFICE 2,127,852

FIELD MARKER

Lee H. Adamson, West Los Angeles, Calif.

Application March 1, 1937, Serial No. 128,415

5 Claims. (Cl. 91—12)

My invention relates to markers for marking polo fields, foot-ball fields and other areas where it is necessary to mark off certain measurement lines with white-wash, or other liquid marking medium, and it has among its salient objects to provide a field marker which can be moved by hand, although the principles thereof could be embodied in larger, power driven apparatus; to provide a marker having a brush held in position to be moved over and upon the surface to be marked with means for feeding the marking medium to the front end or edge of the brush, whereby the brush applies said marking medium in an even line as it is moved over the same; to provide in combination with the brush, side members which project below the brush and confine the medium to a width substantially equal to the width of the brush; to provide means for controlling the flow of the marking medium to the brush, and for stopping its flow completely when it is desired to move the apparatus without its functioning; and, in general, to provide a simple, practical and economical field marker which can be manually moved over a field for marking it in any manner desired.

In order to explain my invention more in detail, I have illustrated it on the accompanying sheet of drawings which I will now describe.

Figure 1 is a bottom plan view of an apparatus embodying my invention;

Figure 2 is a side elevation of the same;

Figure 3 is a vertical, longitudinal sectional view taken on line 3—3 of Fig. 1;

Figure 4 is a fragmentary horizontal sectional view taken on line 4—4 of Fig. 3;

Figure 5 is a vertical sectional view taken on line 5—5 of Fig. 3; and

Figure 6 is a fragmentary view of the parts shown in Fig. 3 in open position to permit the marking medium to run out in front of the moving brush.

Referring now to the drawing in detail, a reservoir 10 is provided to receive the marking medium. A screen 11 is provided therein to prevent any lumps or foreign matter from getting to the outlet opening 12, in the bottom thereof at the front, and which opening is covered and controlled by a valve member 13, adapted to be raised and lowered by a vertical member 14, again referred to.

Mounted on the bottom of said reservoir 10 is a brush 15, extending lengthwise of the reservoir and the direction of movement of the apparatus. Two side members 16, 16, at the opposite sides of said brush 15, and which extend below the bottom of said brush, serve to hold the bristles of the brush in form and to confine the marking medium therebetween as the apparatus is moved over the area being marked, for said side members, it will be seen, extend like runners below and at opposite sides of the brush. At the front end of the brush, and supported on the under side of the reservoir, in front of the outlet opening 12, is a baffle or guide plate 17 to receive the marking fluid or medium and direct it to the lower front end of said brush, in the manner indicated in Fig. 3. A similar member 17' is provided at the rear end of said brush to hold the bristles thereof in good form.

At opposite sides of said side members 16, 16, I have provided two outwardly and downwardly extending members 18, 18, which serve as means to prevent the marker from tilting sidewise. These members are held in place by through bolts, 19, 19, as seen in Fig. 1, extending also through the side members 16, 16.

A handle 20 is provided, connected by means of two side bars or members 21, 21, extended downwardly and forwardly to receive therebetween a wheel 22, which runs freely between the forwardly extended ends of the two side members 16, 16. On said handle is a spring held latch rod 23, the lower end of which is adapted to be inserted through a curved member 24, on the rearward upper part of the reservoir, as seen in Figs. 2 and 3, whereby to lock the handle to the reservoir, and to make it possible to raise the reservoir by means of said handle when it is desired to move the marker on the wheel 22. When said latch rod 23 is withdrawn from the member 24, said handle can be raised at the rear end thereof, and through this movement it operates to open the outlet opening. Pivotally connected with the side members 21, 21, in front of the reservoir 10, is a vertical member 25, having a slot and pin connection, as 26, with a lever 27, and supported by a bracket member 28, the upper end of which has connected therewith a coiled spring 29, the other end of which spring is connected with the upper end of the vertical member 14, for drawing said member 14 forwardly. Pivotally mounted on the upper end of the member 14, is a link 30, which is pivotally connected with another link 27, as at 32, said link 27 being pivotally supported on the bracket 28, whereby said links 27 and 30 constitute a toggle for holding the member 14 back, and valve 13, over the outlet opening 12, closed, as seen in Fig. 3.

A connecting and stop member 33, is pivotally connected at one end to the bracket 28, and is provided with an offset branch 34, adjustably connected with said member 33, and having the stop shoulder at 34' to limit the forward movement of the upper end of the valve operating member 14, as will be understood from Fig. 6. Said branch member 34 can be adjusted along said member 33 by means of the bolts and holes at 35, for the purpose of changing the stop position of the shoulder 34'. This adjustment regulates or controls the opening of the valve member 13 for the outflow of the marking medium, as will be understood from Fig. 6, where the parts are shown in the positions for opening the outlet opening 12.

Connected at the opposite sides of the wheel 22, within the handle members 21, 21, are two pivoted bars or members, as 36, 36, connected with the axle of the wheel 22 at their forward ends, and pivotally supported at 37, with their rearward ends extended and notched, as at 38, to engage a stop pin 39. This makes a flexible connection between the wheel and the marker and pressure on the handle does not depress the brush, and it is also possible for the wheel to have a movement relative to the marker with the stop pin 39 for limiting it.

*Use and operation*

The whitewash or other marking liquid or medium is poured into the reservoir 10 back of the screen 11, with the handle in the position shown in Figs. 2 and 3, and the latch rod 23 in the curved member 24. In this condition, by raising up on the handle the loaded apparatus can be moved on the wheel 22 to starting position. When it is desired to start the apparatus along a line to be marked, the latch rod 23 is withdrawn from the curved member 24, and the handle is then raised, which in turn raises the verticle member 25, which moves the toggle member 27, causing the toggle to move into the position shown in Fig. 6, which opens the valve 13 and allows the marking medium to run out on the baffle member 17 to the front of the brush 15, which is being pushed forwardly at the same time. Thus the brush receives and applies the marking medium to the surface, grass or other area as the apparatus is moved forwardly. The edges of the side members 16, 16, facilitate the straight movement of the marker, as well as to confine the medium therebetween, thus making a straight mark. By lowering the handle, the member 25 pulls down the member 27 and the toggle and spring 29 operate to close the valve 13.

I do not limit the invention to the details shown except as I may be limited by the hereto appended claims.

I claim:

1. A marker of the character referred to which includes a reservoir for marking fluid, a marking brush thereunder arranged lengthwise thereof and of the direction of movement, said brush having a length greater than its width to insure uniform coverage, a valve-controlled outlet from said reservoir for discharging marking fluid down in front of the front end of said brush, side plates at the opposite sides of said brush and having their lower edges extended below said brush to confine said marking fluid to said brush, a handle extended rearwardly and upwardly from the front of said reservoir and brush, said handle having a carrier wheel connected with its lower forward end and pivotally connected with said reservoir, whereby to permit relative movement of said wheel and said reservoir, and means connecting said handle with the valve of said valve-controlled outlet for controlling the supply of marking fluid to said brush.

2. A marker of the character referred to including in combination a reservoir for marking fluid, an elongated marking brush thereunder, lengthwise of the direction of movement to insure uniform application of the marking fluid to the surface, side plates at opposite sides of said brush to confine the marking fluid to said brush, a valve for controlling flow of marking fluid from said reservoir to the front end of said brush, a single carrier wheel in front of said reservoir and connected thereto with a pivoted arm, whereby said wheel can move up and down relative to said reservoir, a handle connected at its forward lower end with said wheel and extended rearwardly and upwardly with means for connecting it with said reservoir for lifting said reservoir, at will, free of the surface to clear said brush therefrom, and means for operating said valve from movement of said handle.

3. A marker of the character referred to including a reservoir for marking fluid, a marking brush lengthwise thereunder, said brush extending lengthwise of the direction of movement a relatively substantial distance under said reservoir, side plates at opposite sides of said brush, a carrier wheel in front of said reservoir having a pivotal connection out in front thereof, whereby to move up and down independently of said reservoir, a handle connected at its forward end with said wheel and at its rearward end detachably connected with said reservoir, connecting means from said handle and a valve for controlling the supply of marking fluid to said brush, and side members out from the opposite sides of said reservoir to slide upon the surface to prevent said reservoir from tilting.

4. A field marker including a reservoir for marking fluid, a marking brush lengthwise under said reservoir and having its back secured to the bottom of said reservoir lengthwise thereof, whereby said brush is lengthwise of and parallel with said bottom, a carrier wheel in front of said reservoir, pivotally connected with the front end of said reservoir, a handle connected to said wheel and extended rearwardly and upwardly and having means for detachably connecting it with said reservoir for lifting the latter on said wheel to free said brush from the surface, a valve-controlled outlet to said brush from said reservoir, and side members along the opposite sides of said reservoir to prevent its tilting.

5. A marker including a reservoir of box form having a marking brush secured lengthwise along its bottom, a carrier wheel connected to the forward end of said reservoir by short pivotal arms to permit said wheel to move up and down relative thereto, a handle connected to said wheel and extended rearwardly and upwardly to the operator, a valve-controlled outlet from said reservoir to said brush, fixed side members at opposite sides of said reservoir adapted to slide upon the surface being marked to prevent tilting, and means for detachably connecting the handle to said reservoir for lifting said reservoir bodily on said wheel.

LEE H. ADAMSON.